United States Patent [19]

Duschatko et al.

[11] Patent Number: 5,146,461
[45] Date of Patent: Sep. 8, 1992

[54] MEMORY ERROR CORRECTION SYSTEM DISTRIBUTED ON A HIGH PERFORMANCE MULTIPROCESSOR BUS AND METHOD THEREFOR

[75] Inventors: Douglas E. Duschatko, Boulder; Nicholas P. Mati, Loveland; Richard A. Herrington, Fort Collins, all of Colo.

[73] Assignee: Solbourne Computer, Inc., Longmont, Colo.

[21] Appl. No.: 455,640

[22] Filed: Dec. 22, 1989

Related U.S. Application Data

[63] Continuation-in-part of Ser. No. 435,931, Nov. 13, 1989, abandoned.

[51] Int. Cl.$^5$ ............................................. G06F 11/10
[52] U.S. Cl. ..................................................... 371/40.1
[58] Field of Search .............................. 371/40.2, 37.1

[56] References Cited

U.S. PATENT DOCUMENTS

| | | | |
|---|---|---|---|
| 4,085,448 | 4/1978 | Kogge | 395/325 |
| 4,468,731 | 8/1984 | Johnson et al. | 395/575 |
| 4,633,472 | 12/1986 | Krol | 371/40 |
| 4,723,244 | 2/1988 | Iacoponi | 371/37.1 |
| 4,791,641 | 12/1988 | Hillis | 371/37 |
| 4,811,361 | 3/1989 | Bacou et al. | 375/25 |
| 4,965,883 | 10/1990 | Kirby | 371/52 |
| 4,995,041 | 2/1991 | Hetherington et al. | 371/40.1 |

OTHER PUBLICATIONS

Lin, S., et al., *Error Control Coding*, copyright 1983 by Prentice-Hall, Inc., N.J., pp. 111-113.
Pryce, D., "Fiber-optic ICs accelerate communication over data links", *EDN*, Jun. 9, 1988, pp. 63-72.
Grover, W., "Forward Error Correction in Dispersion-Limited Lightwave Systems", *IEEE J. Lightwave Technology*, vol. 6, No. 5, May 1988, pp. 643-654.
Tate, G., et al., "EDC chip boosts memory reliability", *Electronic Design*, Sep. 1, 1980, pp. 151-155.
Twaddell, W., "Error-checking and -correcting ICs see wider use as memory size grows", *EDN*, Mar. 4, 1981, pp. 31-40.
No author, "Bus ECC for High Availability and Recovery in Real Time", *IBM Technical Disclosure Bulletin*, vol. 32, No. 5B, Oct. 1980, pp. 235-236.
Rao, T., et al., *Error-Control Coding for Computer Systems*, copyright 1989, pub. by Prentice-Hall, Inc., pp. 138-143.

*Primary Examiner*—Stephen M. Baker
*Attorney, Agent, or Firm*—Dorr, Carson, Sloan & Peterson

[57] ABSTRACT

A distributed error correction circuit for a synchronous high performance multiprocessor bus wherein the memory directly transfers data containing error fields to the multiprocessor bus without performing an error check. Each device, such as a plurality of processors or input/output busses, connected to the multiprocessor bus has error correction circuitry located between the multiprocessor bus and the device to perform error correction while the data is being transferred off the multiprocessor bus and stored in data buffers at the bandwidth of the multiprocessor bus. The error correction circuit detects and corrects data errors caused by the memory or the multiprocessor bus. The stored data is later transferred out of the buffers at the bandwidth of the device. Data from a device is delivered into the device buffers at the bandwidth of the device for later delivery of the data into memory at the bandwidth of the multiprocessor bus. During such transfers, the error correction circuitry generates the error field as the device data is transferred onto the multiprocessor bus.

13 Claims, 9 Drawing Sheets

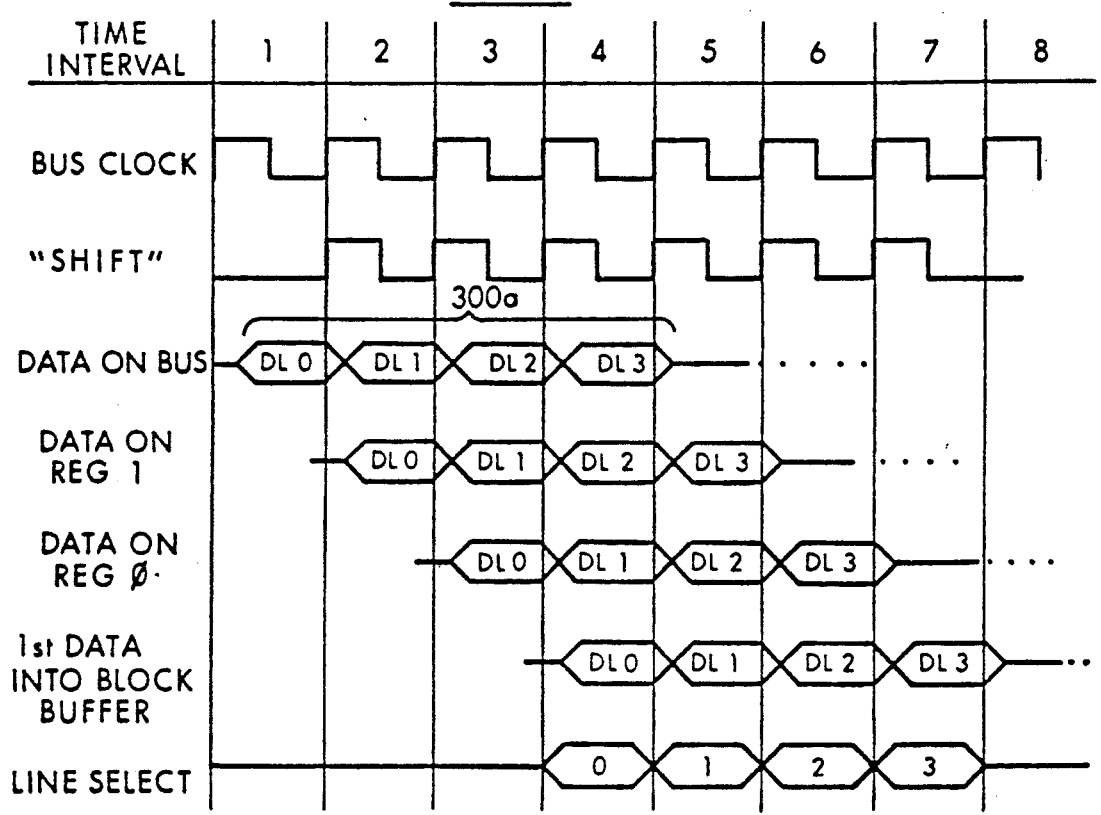
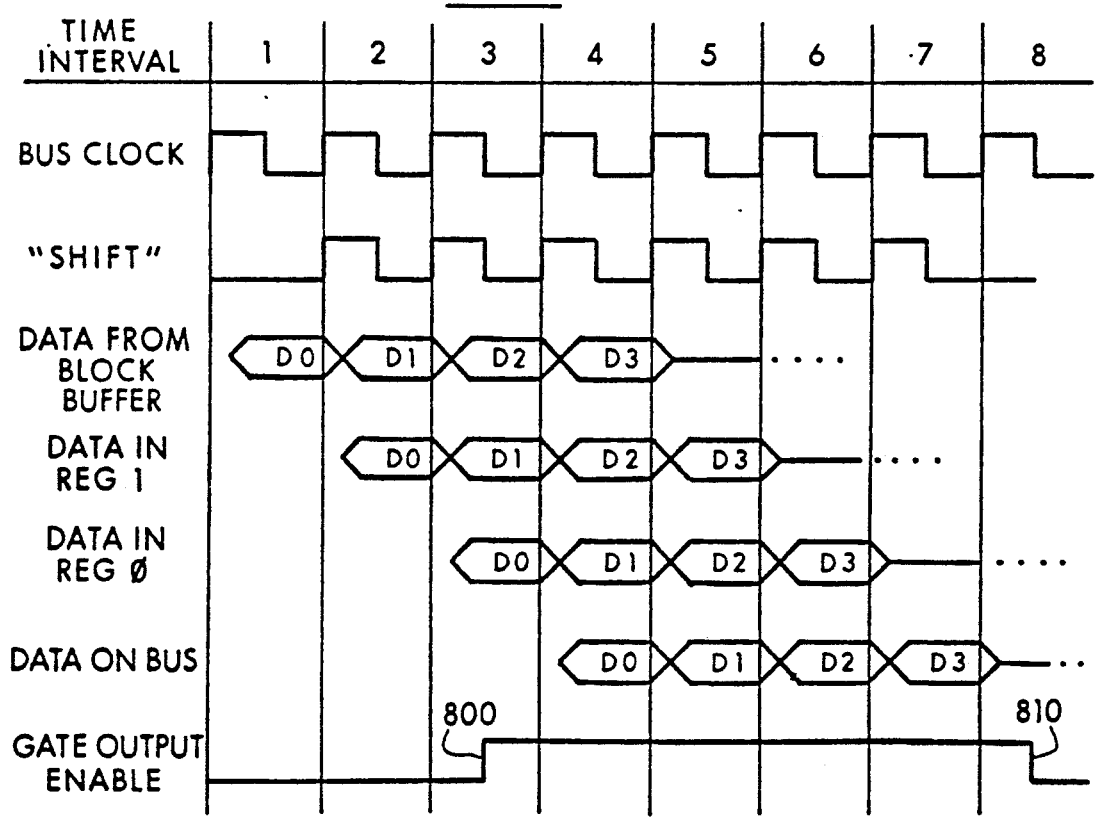

MEMORY ERROR CORRECTION SYSTEM DISTRIBUTED ON A HIGH PERFORMANCE MULTIPROCESSOR BUS AND METHOD THEREFOR

BACKGROUND OF THE ART

1. Related Application

This invention is a continuation-in-part to co-pending application entitled "Memory Error Correction System Distributed On A High Performance Multiprocessor Bus And Method Therefor", filed Nov. 13, 1989, U.S. Ser. No. 435,931, now abandoned.

2. Field of the Invention

The present invention generally relates to error correction systems for reading and writing data into and out from memory of computer systems and, more particularly, the present invention pertains to an error correction circuit (ECC) distributed on a multiprocessor bus for reading and writing data over the bus into and out from memory.

3. Statement of the Problem

FIG. 1 sets forth a conventional computer system bus 1 composed of a data bus 1a, an address bus 1b, and a control bus 1c. Interconnected with bus 1 is a memory 3 which transfers data between its memory cells through an error correction circuit (ECC) 5 and bus 1. Also interconnected to the bus 1 are other devices such as one or more processors 7 and one or more input/output buses 9. As shown in FIG. 1, the processor 7 is connected directly to the bus 1 and the input/output (I/O) bus 9 is connected through an interface card 11 which typically contains an I/O bus controller chip. A number of peripheral devices 13 may be interconnected to I/O bus 9.

In simplistic operation, a block of data from a peripheral device 13 on I/O bus 9 can be delivered into memory 3 for storage and for use by processor 7. Likewise, blocks of data in memory 3 can be delivered onto bus 1 for delivery through the interface card 11 onto I/O bus 9 and into a particular device 13.

Memory 3 is usually a dynamic random access memory. These types of memories, however, exhibit dynamic memory failures wherein one memory cell in a line of data may be in error. Conventional error correction circuits are available to provide detection and correction of such dynamic memory errors. These types of circuits 5 operate in the following fashion. If a line of data (for example, sixty-four bits (eight bytes) wide as shown in FIG. 1) is delivered on bus 1a through error correction circuit 5, the circuit 5 generates a check bit CB field (i.e., a field of predetermined length added onto the data line such as a field of 8 bits). Hence, as the data travels from bus 1a through the error correction circuit 5 and into a storage location in memory 3, eight check bits are generated and added to the data line and stored in memory 3. Later, when the data line with the associated check bits is read out from memory 3, the data line and check bits are delivered into the error correction circuit 5. The circuit 5 regenerates a new check bit field based upon the sixty-four bit data line and compares the new check bit field with the stored check bit field. If errors are detected, an error syndrome is generated which is utilized to correct the bit or bits in the sixty-four bit data field. The corrected data field is then delivered onto bus 1a. Hence, the error correction circuit 5 performs a useful function in protecting against dynamic failures. Such error correction circuits 5 are typically composed of levels of logic gates which operate according to any one of a variety of error correction codes, techniques, and algorithms. The error correction circuit 5 is placed between the bus and the memory 3 and is used to conventionally protect the integrity of the data stored in memory 3.

In most bus system arrangements such as that shown in FIG. 1, the placing of the error correction circuit 5 between the memory and the bus 1 does not establish a "bottleneck" to the operation of the system. For example, if the I/O bus 9 is a conventional VMEbus which has a maximum operating bandwidth of 40 Megabytes per second responds to processor 7 and I/O bus 9 requests asynchronously, the transmission of data between the memory and the I/O bus 9 never exceeds the maximum bandwidth of 40 Megabytes per second. In fact, VMEbuses typically operate in the 25 to 40 Megabyte per second bandwidth. In actual operation the bandwidth may be less since a given device 13 of much lower bandwidth may seize the I/O bus and force the system bus 1 to operate at the bandwidth of the device.

At such transfer rates, the error correction circuit 5 is designed to operate within a bus cycle which, as mentioned, is asynchronously dictated by a peripheral device on I/O bus 9. Hence, at the start of a transfer cycle, data is delivered onto bus 1a from an I/O device 13 (via bus 9 and interface card 11) and by the time the data is ready to be written into memory 3, the error correction circuit 5 is fast enough to perform the check bit generation function. This arrangement works quite well and variations of this type are found in commercially existing products.

A problem exists with the prior art approach shown in FIG. 1. As the bandwidth of the bus 1 increases, transfers of data from memory 3 to a device on the bus 1 whether it be the processor 7 or an I/O device reaches a bottleneck at the error correction circuit 5. For example, if the bandwidth of bus 1 is equal to or greater than the bandwidth of the memory 3, at least one bus cycle (if not more bus cycles) become necessary to allow the error correction circuit 5 to operate. The addition of even one cycle to perform error correction with each data transfer on the bus significantly affects the bandwidth of the system in processing data. To illustrate this, assume it takes six clock cycles to transfer a block of data containing four lines from a memory location in memory 3 to data bus 1a and further assume that it takes one clock cycle to perform error correction, the elimination of this one cycle would result in an almost seventeen percent improvement in the bandwidth of the bus 1 (i.e., from six cycles per data block transfer to five clock cycles per data block transfer).

4. Solution to the Problem

The high performance bus of the present invention solves the above problem by distributing the error correction circuit 5 from its location shown in FIG. 1 to locations at each processor 7 and at each I/O bus interface card 11. Hence, the present invention increases the hardware by adding error correction circuitry at each of these locations and by adding additional bus lines in the data bus 1a to handle the additional check field bits which in the prior example were eight.

Although the present invention has more hardware and bus lines in the system, the bandwidth of the system bus 1 substantially increases due to the simultaneous operation of multiple ECC circuits and the error detection and correction process now includes errors resulting from bus or bus component failures.

The bus system of the present invention utilizes a high performance synchronous bus which operates at bandwidths equal to or greater than the bandwidth of memory 3. In addition, a number of processors are interconnected with the system bus as well as a number of I/O buses. These devices (i.e., one or a plurality of processors and/or one or a plurality of I/O buses) may be of any suitable configuration since the distributed error correction circuit of the present invention is independent of system configuration.

The system bus of the present invention further utilizes a synchronous bus which results in the high performance bandwidth of the present invention. Under the teachings of the present invention, the error correction circuit 5 is removed as a bandwidth bottleneck between the system bus 1 and the memory 3. In the high performance multiprocessor buses of the present invention, the ECC is distributed into the processors 7 and the I/O bus interface cards 11.

Finally, the present invention provides error correction between processors (and the I/O interface) as data is transferred over the bus of the present invention. This is an additional benefit of the distributed ECC of the present invention. This error correction also occurs without sacrificing the bandwidth of the bus.

SUMMARY OF INVENTION

The present invention sets forth a distributed error correction system for memory interconnected with a high performance multiprocessor bus. Also interconnected to the high performance bus are a plurality of processors and at least one input/output bus. The present invention includes a first distributed error correction circuit connected to the input/output bus interface and to the multiprocessor system bus for selectively receiving a block of data containing a number of lines of data having an error field associated with each line from the memory. The block of data is delivered from the memory directly to the multiprocessor bus and into the first error correcting circuit located at the input/output bus interface at a bandwidth equal to or greater than the bandwidth of the memory. The first error correcting circuit is capable of detecting and correcting errors in the block of data as the block of data is being received from the high performance bus of the present invention. Distributed error correction circuits are also located at each of the processor connections to the high performance bus. The distributed error correction circuits of the present invention detect and correct any errors in the data as it is read from the memory over the high performance bus. These circuits also generate error check information which is added onto each line of data as it is delivered onto the bus for writing into the memory.

DESCRIPTION OF THE DRAWING

FIG. 7 is a timing diagram illustrating a READ from memory over the high performance multiprocessor synchronous bus of the present invention;

FIG. 8 is a timing diagram illustrating a WRITE to memory over the high performance multiprocessor synchronous bus of the present invention;

GENERAL DISCUSSION

Figure 2:
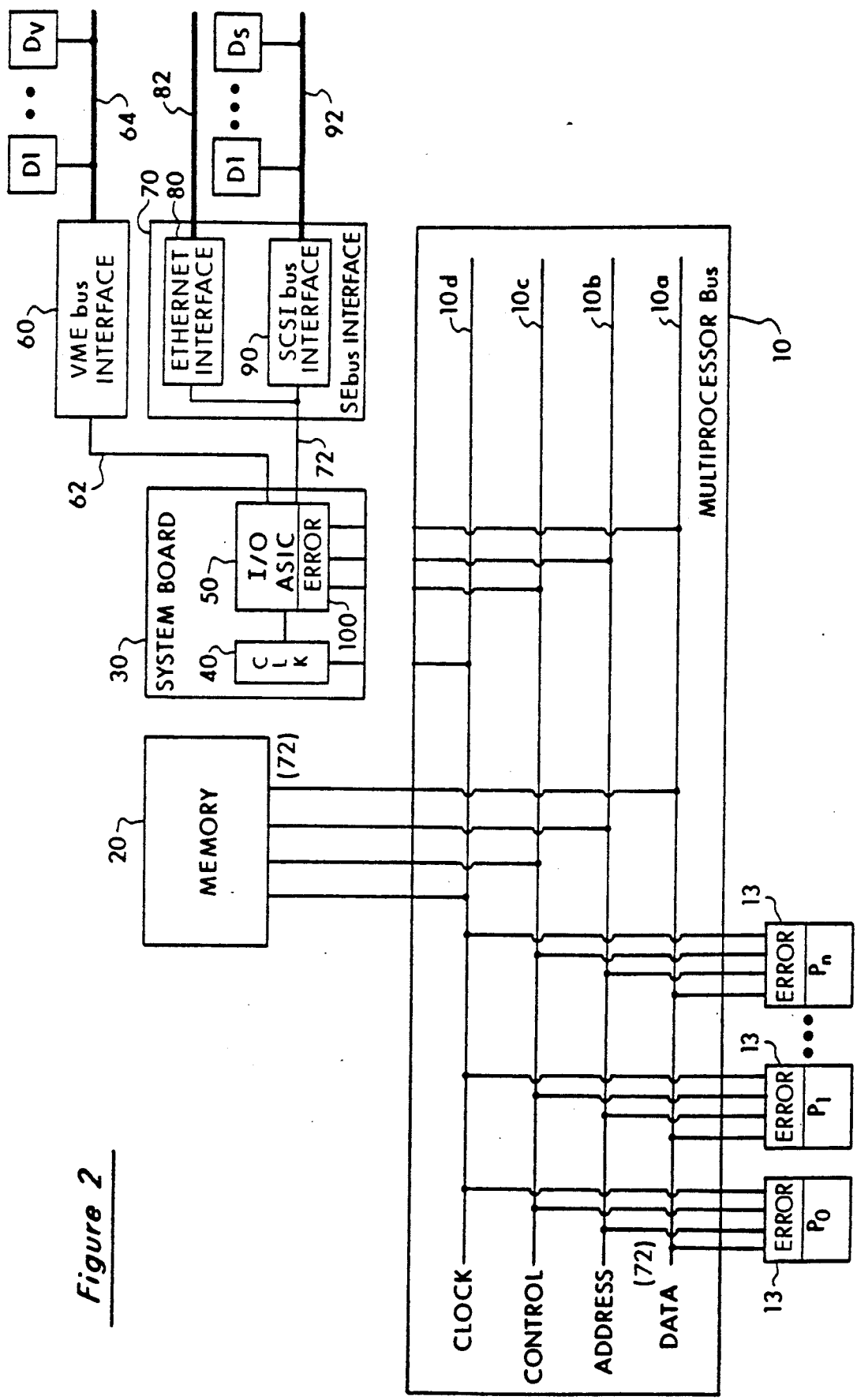
FIG. 2 is a block diagram of the synchronous high performance multiprocessor bus of the present invention with distributed error correction circuits.

In FIG. 2, the high performance multiprocessor bus 10 of the present invention is shown having a data bus 10a, an address bus 10b, a control bus 10c and a clock bus 10d. A plurality of processors $P_o$ through $P_n$ interconnect with the multiprocessor bus 10. A memory 20 which may comprise a single memory chip, a memory board, or a plurality of chips or boards is also interconnected to the multiprocessor bus 10. A system board 30 also interconnects to bus 10. On system board 30 is a clock 40 which provides timing to the system bus 10 and to the circuits which interface with the system bus.

An I/O ASIC 50 is also provided. The term ASIC is conventional for Application Specific Integrated Circuit. The I/O ASIC 50 of the present invention, in a preferred embodiment, interconnects with the system bus 10, with a VMEbus interface 60, and with a SEbus (i.e., SCSI-Ethernet bus) interface 70. The VMEbus interface 60 is further connected over bus 62 to the I/O ASIC 50 and is also connected to a standard VMEbus 64 to which a number of peripheral devices $D_i$–$D_v$ are connected. The SEbus 70 contains an Ethernet interface 80 comprising a conventional Ethernet controller chip and a Small Computer System Interface (SCSI) bus interface 90 comprising a conventional SCSI controller chip. The Ethernet interface 80 and the SCSI bus interface circuit 90 are interconnected over bus 72 to I/O ASIC 50. The Ethernet interface 80 interconnects with Ethernet 82 and the SCSI bus interface 90 interconnects with the SCSI bus 92 to which are interconnected a number of devices $D_i$–$D_s$. While the present invention transfers data between three conventional I/O bus systems, it is to be expressly understood that the present invention can interconnect with any number of conventional I/O bus systems.

The system bus 10 of the present invention is synchronous being under control of clock 40 which, in the preferred embodiment, is a 20 MHz clock. Clock pulses are provided every fifty nanoseconds on clock bus 10d. The bandwidth of the high performance bus 10, in the preferred embodiment, is 128 Megabytes per second. It is to be expressly understood that the bandwidth of the present invention is not to be limited to this value and may be faster or slower depending upon system requirements or advances in technology.

Figure 1:
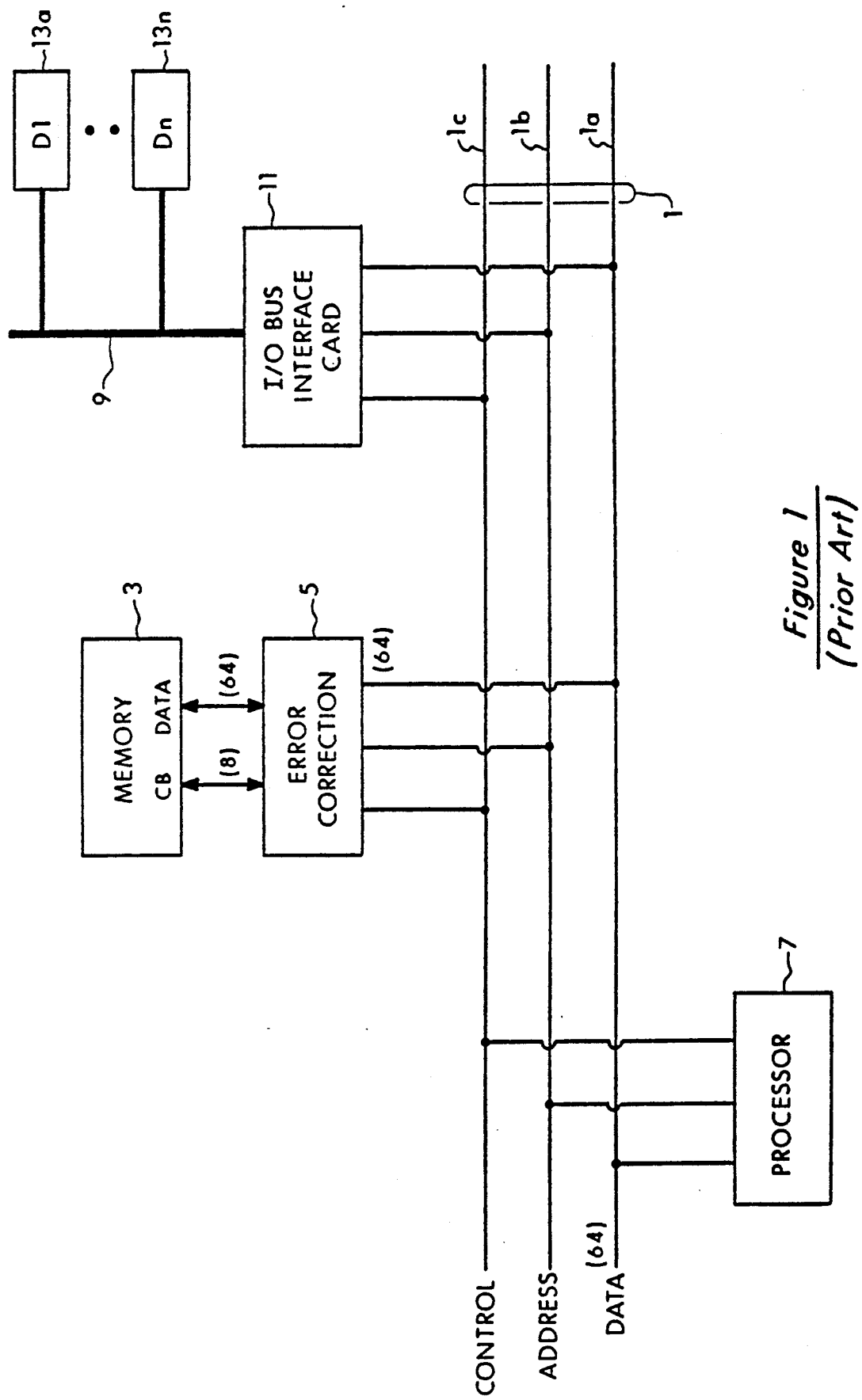
FIG. 1 is a block diagram representation of a conventional asynchronous bus system having error correction circuitry located between the bus and the memory.

In comparison to FIG. 1, the error correction circuit 5 of FIG. 1 is removed as a bottleneck between the system bus 10 and memory 20 of the present invention. Hence, for a 64-bit wide data line and an 8-bit wide check bit CB or error field, eight additional data lines are found in the data bus 10a of the present invention for a total of 72 data lines. In addition, distributed error correction occurs in the bus interface circuits 100 and 110. The distributed error correction circuits 100 provide an interface between the system bus 10 and each of the plurality of processors $P_n$ whereas the distributed error correction circuit 110 provides an interface between the system bus 10 and the I/O ASIC 50. The clock 40 is used, in part, to control the error correction circuits 100 and 110.

Figure 3:
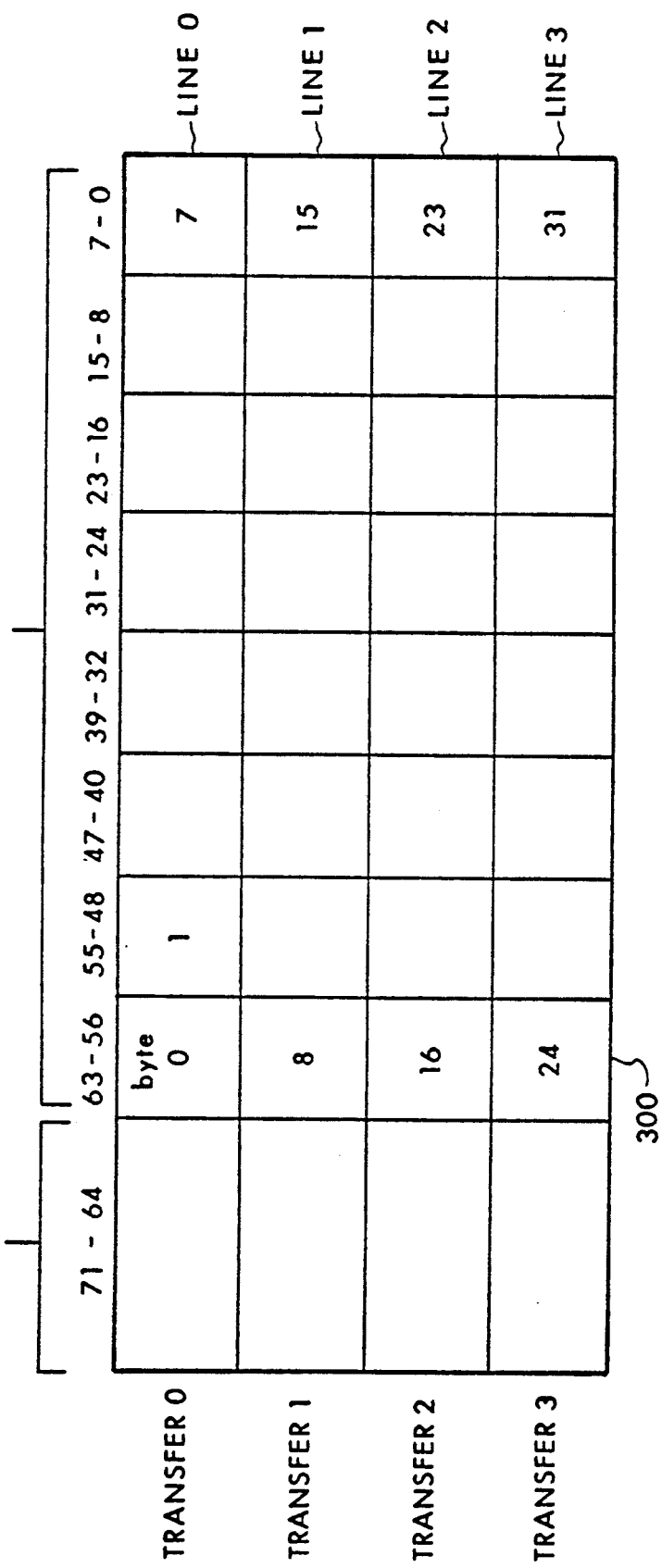
FIG. 3 is an illustration of a block of data transferred on the high performance multiprocessor bus of FIG. 2.

In FIG. 3, an example of a block of data 300 transferred on the system bus 10 of the present invention is set forth. The block of data contains four lines and, in the preferred embodiment, each line comprises eight bytes of data (i.e., bits 0–63). The block 300 contains a total 32 bytes of data. Each line also contains a check bit field comprising, in the preferred embodiment, bits 64–71. Again, the invention is not constrained to the aforesaid data line or check bit widths (more or less than 8 bits could be used). Furthermore, the block of data could have any number of data lines (more or less than 4 lines could be used).

Figure 4:
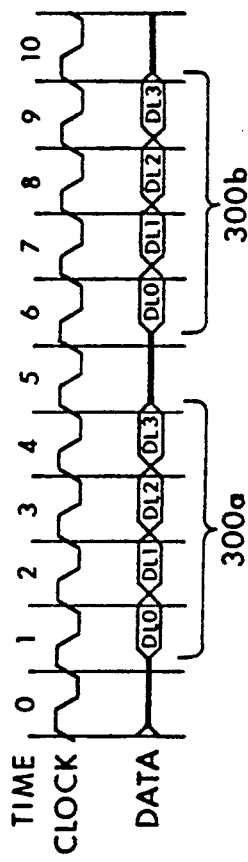
FIG. 4 is a timing diagram showing the transfer of lines of data in two blocks of data at the bandwidth of the high performance multiprocessor synchronous bus of the present invention.

In FIG. 4, an example showing the maximum transfer rate of blocks of data 300 on the system bus 10 of the present invention is illustrated. The clock 40 produces a series of clock pulses of 25 nanoseconds in duration. The period for each clock pulse is 50 nanoseconds and each period is identified by a separate time interval 0–10 in the example of FIG. 4. During time intervals 1–4, a block of data 300a could be, for example, transferred from memory 20 of FIG. 2 to I/O ASIC 50 and during time intervals 6–9, a block of data 300b could be transferred from memory 20 to processor $P_o$. Each transfer illustrated in FIG. 4 requires the delivery of four lines of data. Hence, with reference to FIGS. 3 and 4, each line is transferred in one time interval i.e., time interval 1, line zero of data block 300a during time interval 1, line zero of data block 300a is transferred. It is to be expressly understood that any suitable frequency for clock 40 could be used such as 20 or 30 nanosecond duration pulses.

Under the teachings of the present invention, a block of data is transferred from memory 20 to the I/O ASIC 50 for subsequent delivery to a device D on an I/O bus (e.g., device Dv on VMEbus 64 or $D_s$ on SCSI bus 92). The transfer of block of data 300a to the I/O ASIC 50 occurs according to the timing shown in FIG. 4. After transfer of the fourth line of data during time interval 4, the system bus 10 is free to allow data block transfers between other devices such as processor $P_o$ during time intervals 6–9.

Error correction of the present invention occurs in the distributed error correction circuit 110 (or 100) as the data is being transferred to the I/O ASIC 50 (or to a processor $P_n$) and does not impact the transfer rate or bandwidth of the system bus 10. The processors $P_n$ and I/O ASIC 50 are collectively termed bus data circuits capable of transferring data between the circuit (i.e., one or a plurality of processors $P_n$ or one or a plurality of I/O ASICS 50) and the bus for delivery to memory (or to another bus data circuit). This is a marked departure from the teachings of a conventional approach such as shown in FIG. 1.

DETAILED DESCRIPTION

As shown in FIG. 2, the I/O ASIC 50 of the present invention is, in the preferred embodiment, a 64-bit chip implemented in 1.5 micron Complementary Metal-Oxide Semiconductor (CMOS) standard cell technology. A 223 Ceramic Pin Grid Array (CPGA) package is utilized which interfaces the VMEbus interface 60, the SCSI interface 90, and the Ethernet interface 80 all of which are conventional to a multiprocessor bus 10 of the type identified in the above co-pending application. The I/O ASIC 50 of the present invention, in the preferred embodiment, permits communication according to cache consistency protocols between the multiprocessor bus 10 having a bandwidth of 128 MBytes/sec and the VMEbus 64 having a typical bandwidth of 25 MBytes/sec, the Ethernet bus 82 having a typical bandwidth of 1.25 MBytes/sec and the SCSI bus 92 having a typical bandwidth of 4 MBytes/sec.

This is a preferred embodiment and is one that both the number and the design of the various bus interfaces can change and still fall within the teachings of the present invention.

Overview

The primary function of the I/O ASIC 50 of the present invention is to buffer up relatively low speed signals from I/O devices D for presentation on the system bus 10 at full bus speed. The I/O ASIC 50 also functions to receive data from the bus 10 at full speed and present it to I/O devices D at their respective bus speeds. In addition to buffering transfers to and from the bus 10, the I/O ASIC 50 is responsible for generating eight error correction and check bits CB for all lines in any block of data 300 going from an I/O device D to the system bus 10. For any block of data 300 coming from the bus 10 to an I/O device D, the I/O ASIC 50 is responsible for doing a data check, error correction and providing correct data to the VMEbus interface 60 and the SEbus interface 70.

The I/O ASIC 50 also functions as a synchronizer when it is necessary for a processor $P_n$ to access an I/O device D in a slave Register I/O (RIO) transaction. When control register access is needed, the I/O ASIC 50 has the responsibility of performing as a busmaster for the respective I/O bus. During RIO transactions no error checking or check bit generation is performed.

The VMEbus interface 60 handles the conventional VMEbus protocol including address/data, data strobes, and acknowledges. VMEbus interrupts and bus arbitration are handled external to the I/O ASIC 50. The second I/O bus 72 is similar to the VMEbus I/O bus 62 except that it is designed specifically to support the two circuits that are attached to it — i.e., a SCSI controller chip 90 and an Ethernet controller chip 80.

2. Architecture

Figure 5:
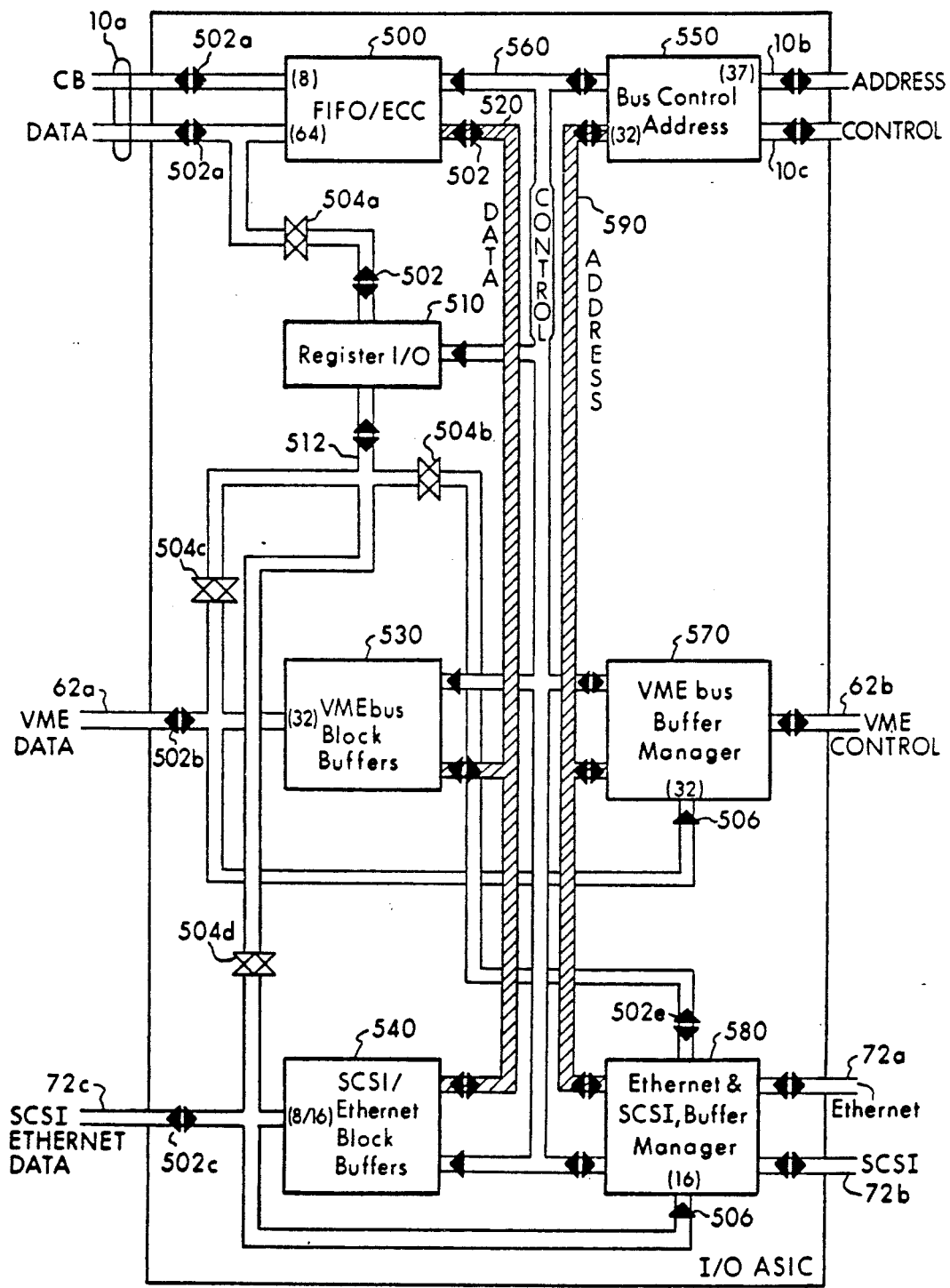
FIG. 5 is a block diagram of the Input/Output Application Specific Integrated Circuit (I/O ASIC) of the present invention.

This section describes the specific features of the I/O ASIC 50, as detailed in FIG. 5, from an overall system performance point-of-view.

a. FIFO/ECC 500

The FIFO/ECC 500 is a two-stage pipelined ECC that generates check bits CB during I/O ASIC 50 writes to bus 10 and which performs single bit error correction (and multi-bit error detection) during I/O ASIC 50 bus reads. The FIFO/ECC 500 performs as a high speed data staging area whenever data is being transferred over the Internal Data bus 520 to or from any of the internal block buffers 530, 540. In the preferred embodiment, the FIFO/ECC 500 is interconnected for two-way communication 502a to the data bus 10a of the multiprocessor bus 10. The data bus 10a contains a check bit CB field of 8 bits and a DATA field of 64 bits. The FIFO/ECC 500 receives control signals from the Bus Control/Address circuit 550 over Internal Control bus 560.

b. Register I/O (RIO) 510

The register I/O (RIO) circuit 510 is used to handle the data during any slave access to a VMEbus device $D_v$, the SCSI interface chip 90, the Ethernet interface 80, or internal I/O ASIC registers (found in managers 570 and 580). It performs all data capturing, byte rotation and data multiplexing for any of the above mentioned accesses. Register I/O circuit 510 is interconnected with the data bus 10a through a suitable two-way communication path 504a (i.e., being capable of turning the bus off in either direction or both directions). The RIO circuit 510 has its output connected to bus 512 for switchable communication 504b to the Ethernet and SCSI Bus Control, Address, Buffer Manager 580 (two-way communication 502e), (b) switchable communication 504c to bus 62a (via two-way communication 502b) and (c) switchable communication 504d to bus 72c (via two-way communicator 502c) bus 72.

c. Internal Data Bus 520

The Internal Data bus 520 is used for all internal data movement between the FIFO/ECC circuit 500 and the internal data buffers 530 and 540.

d. vMEbus Data Buffers 530

The VMEbus data buffer section 530 consists of three 32-byte data buffers (i.e., corresponding to three blocks of data 300). Two of these buffers are dedicated exclusively to transferring VMEbus block mode data while the third buffer is used exclusively for handling VMEbus non-block mode data. All three data buffers 530 are byte addressable. The VMEbus Block Buffers 530 are interconnected to the Internal Data bus 520, the Internal Control bus 560 and to bus 62a which is the address/data portion (32 bits) of bus 62.

e. SCSI/Ethernet Block Buffers 540

The SCSI (8 bit) and Ethernet (16 bit) buses each have one dedicated 32-byte data buffer in the combined buffers 540. Access to these buffers is via a common external address/data bus 72c. The SCSI data buffer is byte addressable and the Ethernet data buffer is two byte addressable. As shown in FIG. 5, the SCSI/Ethernet Block Buffers 540 are interconnected to the Internal Data bus 520, the Internal Control bus 560, and to bus 72c.

f. Bus Control and Address 550

The bus control and address circuit 550 is responsible for staging addresses to be put on the address bus 10b and for asserting and monitoring various bus control signals 10c. It also arbitrates use of the FIFO/ECC 500 and provides control information signals to the FIFO/ECC 500, Register I/O 510, and all buffer management circuits 570 and 580. The Bus Control Address circuit 550 is also interconnected with the Internal Control bus 560 and the Internal Address bus 590.

g. Internal Control Bus 560

The Internal Control bus 560 delivers all I/O ASIC 50 internal control signals.

h. vMEbus, Bus Control, Address and Buffer Manager 570

The VMEbus Buffer Manager, Bus Control and Address Circuit 570 is responsible for doing all address handling, data buffer status updating, and bus control functions associated with the VMEbus Interface 60. This circuit also communicates with the internal control bus 560 and internal address bus 590 and provides all internal control signals to the VMEbus data buffers 530.

i. SCSI and Ethernet, Bus Control, and Buffer Manager 580

The SCSI and Ethernet Buffer Manager, Bus Control, and Address 580 performs all address handling, data buffer status updating, and bus control functions associated with the SCSI and Ethernet ports 90 and 80. It also communicates with the internal control bus 560 and internal address bus 590 and provides all control signals to the SCSI and Ethernet data buffers 540.

j. Internal Address Bus 590

The Internal Address Bus 590 delivers addresses internally to the VMEbus, Ethernet, and SCSI Buffer Managers 570 and 580.

While the architecture shown in FIG. 5 is a preferred embodiment, it is to be expressly understood that this is set forth as an example of an environment for implementing the distributed error correction circuitry of the present invention. The teachings of the present invention could find equal application in architectures using only a single I/O such as simply a VMEbus or in architectures using more or less, including future I/O buses. Furthermore, the arrangement of the RIO 510, the buffers 530 and 540, the control 550, and the managers 570 and 580 can vary from application to application and still be covered by the teachings of the present invention.

4. FIFO-ECC Circuit 500

Figure 6:
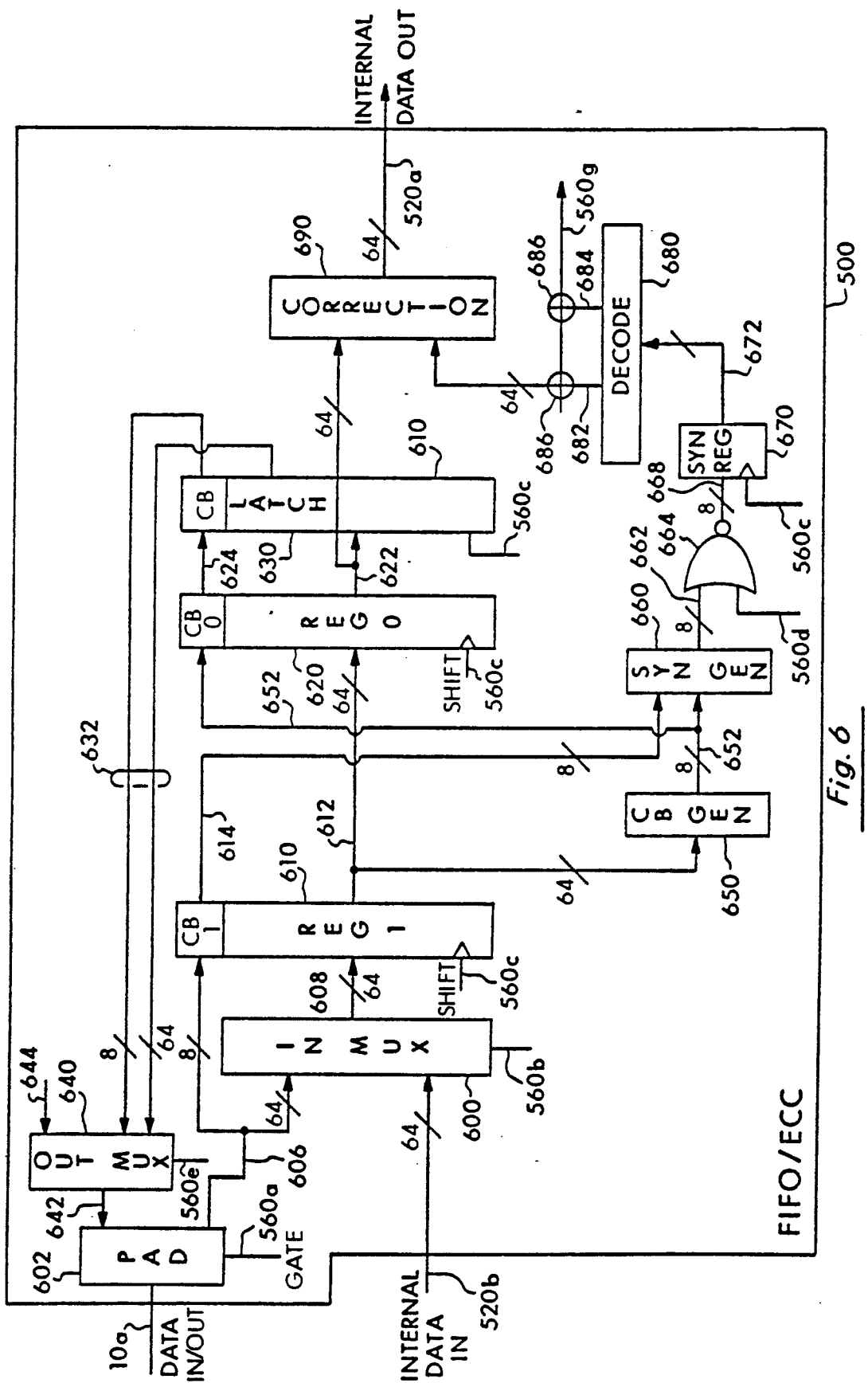
FIG. 6 is a block diagram schematic of the Error Correction Circuit (ECC) of the present invention.

Details of one of the distributed FIFO-ECC Circuit 500 is shown in FIG. 6. The FIFO-ECC Circuit 500 is configured as seventy-two bits wide (64 data bits and 8 check bits) by two lines and is used to buffer data onto and off of the multiprocessor bus 10. This circuit 500 permits communication between the multiprocessor bus at the full bandwidth of the bus (i.e., in the preferred embodiment 128 Megabytes/sec) during both READ and WRITE cycles. In addition, circuit 500 incorporates a pipeline ECC that is used as data enters or leaves the circuit.

In FIG. 6, the FIFO portion of the circuit 500 contains an input 2:1 multiplexer 600, two registers 610 and 620, a latch 630 and an output 2:1 multiplexer 640. The error correction portion includes a check bit generator 650, a syndrome generator 660, a syndrome register 670, a bit-in-error decode 680 and correction gates 690.

The data portion 10a of the multiprocessor bus 10 is delivered to pad logic 602. The incoming line of data block 300 from bus 10a is delivered into a suitable logic buffer in circuit 602 and the data being delivered onto bus 10a is gated by means of control 560a in a tri-state gate control onto bus 10a also contained in circuit 602.

The incoming data is internally delivered on circuit 500 over bus 606. Sixty-four data bits are delivered into the input multiplexer 600 and the eight check bits are delivered into the check bit portion of register one 610. The input multiplexer 600 also receives sixty-four bits of data from the Internal Data bus 520b as set forth in FIG. 5 for the I/O ASIC 50. The selection as to which data is to be selected (i.e., from the multiprocessor bus 10 or from the internal data bus 520b) is determined by the state of signal 560b from the Internal Control bus 560.

The sixty-four bits of data are then delivered into register one 610 under control of signal 560c which is a clock signal from the Internal Control bus. Register one 610 delivers its sixty-four bits of data output over bus 612 to both register zero 620 and to the check bit generator 650. The check bit generator 650 is, in the preferred embodiment, six levels of exclusive-OR (XOR) gates. The eight bit output 652 of the check bit generator 650 is delivered into the syndrome generator 660 and into the check bit portion of register zero 620. The syndrome generator 660 is, in the preferred embodiment, one level of XOR gates and receives its second input from the check bits of register one 610 over lines 614. The syndrome generator 660 is connected over the eight bit lines 662 to NOR circuit 664. Under control of lead 560d of Internal Control bus the NOR circuit 664 activates or deactivates the error correction circuit of the present invention.

The eight bit output of circuit 664 is delivered over lines 668 to the syndrome register 670 which is under control of the clock 560c. The output of the syndrome register 670 is delivered over lines 72 into the bit-in-error decode circuit 680. The output of the bit-in-error decode circuit 680 is delivered over lines 682 to the correction circuit 690. In addition, an error control signal 560g is generated from lines 682 and lines 684 and delivered 560g out from the FIFO-ECC circuit 500 over the Internal Control bus 560. Register zero 620 is activated by the clock pulse on lead 560c and delivers its data output over bus 622 to the latch 630 and to the correction circuit 690. The output of the correction circuit 690 comprises the data on Internal Data bus 520a and is sixty-four bits wide.

The output of latch 630 is delivered on bus 632 to the output 2:1 multiplexer 640. The output 2:1 multiplexer 640 also receives internal data over bus 644 from the RIO circuit 510. The output of the output multiplexer 640 is delivered over bus 642 to the pad logic 602 for delivery through tri-state logic gates (not shown) to the multiprocessor data bus 10a.

4. Operation of FIFO-ECC Circuit 500

The operation of the Circuit in FIG. 6 will now be explained.

The circuit 500 permits data to be transferred from the multiprocessor bus 10, at the full bus bandwidth, during both READ and WRITE cycles to and from the I/O ASIC 50. The transfer occurs in a two-pipeline fashion over six clock cycles. For example, assume that a data block 300, as shown in FIG. 3, is placed on bus 10a. The first line of the data is he pad logic 602 to bus 606. The input multiplexer 600 is set on line 560b to deliver the data to the input of register one. The operations that take place are summarized in Table I:

TABLE I
DATA TRANSFER: BUS 10 TO I/O ASIC 50

| | |
|---|---|
| | Interval 1: |
| DL0 | Clocked into REG1 |
| | CB is then generated |
| | Syndrome is then generated |
| | Interval 2: |
| DL0 | Data is clocked into REG 0 |
| | Syndrome for DL0 is clocked into Syn Reg |
| | Bit-in-Error is then decoded 680 |
| | Error correction is then made |
| DL1 | Clocked into REG 1 |
| | CB is then generated |
| | Syndrome is then generated |
| | Interval 3: |
| DL0 | Corrected data is clocked into internal buffer over 520a |
| DL1 | Data is clocked into REG 0 |
| | Syndrome for DL1 is clocked into Syn Reg |
| | Bit-in-Error is then decoded 680 |
| | Error correction is then made |
| DL2 | Clocked into REG 1 |
| | CB is then generated |
| | Syndrome is then generated |
| | (Repeats for remaining DLs) |
| | Interval 6: |
| DL3 | Corrected data is clocked into internal buffer over 520a | where DL = Data Line

In Table I and with reference to the transfer of block 300a as shown in FIG. 3, during the first time interval and upon the leading edge of that clock cycle, the first line of data (DLO) on lines 608 is clocked into register one 610. With the first line of the data (DLO) in register one, a check bit field is generated and placed on lines 652 by the check bit generator 650 and the generated check bits on lines 652 are compared with the delivered check bits in register one appearing on lines 614 by the syndrome generator 660. A non-zero syndrome is generated when the comparison indicates an error and the syndrome is generated on lines 662.

The check bits are generated on lines 652 in a conventional fashion utilizing a six level XOR gate arrangement. Appendix I sets forth the Hamming Codes used in the ECC check bit generation of the present invention. In Appendix I, the column entitled "Generated Check Bits" corresponds to the eight individual check bit signals that appear on line 614 as well as on line 652. The column entitled "parity" denotes whether each individual check bit has even or odd parity. Based on the Hamming Codes shown in Appendix I, each of the eight individual check bit signals that appear on line 614 and on lines 652 are generated as the exclusive-OR or exclusive-NOR (depending if even parity or odd parity is denoted in the column "parity" of Appendix I) of the data bits marked under the column "participating data bits." Each of the generated check bits then is the exclusive-OR or exclusive-NOR of the participating 32 out of the possible 64 data bits in the 64 bit data word. The syndrome bits that appear on lines 662 are the bit by bit exclusive-OR of the eight individual check bits from lines 614 with the eight individual check bits from lines 652. The circuit 664 is used to disable ECC checking when the signal 560d is asserted. The ECC circuit is disabled by forcing the value 0 on each of the eight syndrome lines of signal. The determination of the final syndrome 668 occurs in the time between the occurrence of the leading edge of the first clock pulse and the leading edge of the second clock pulse. At the leading edge of the second clock pulse (Interval 2 in Table I), data line zero (DL0) is clocked by lead 560c into register zero and the syndrome information is clocked into the syndrome register 670. At this time, the second data line DL1 is delivered into register one and the syndrome generation process commences in circuits 650 and 660 on data line ONE.

During the time between the second time interval and the third interval, the syndrome for the first data line DL0 is delivered over lines 672 to the bit-in-error decode circuit 680. This circuit 680 is a logic decoder which operates according to the values set forth in Appendix II. In Appendix II, the syndrome bits S0 through S7 are shown and correspond to the syndrome bits appearing on signal 672. For example, if no error is detected in data line zero, all syndrome bits 672 are zero and the entry N exists for "no error detected." However, if the value 10001111 appeared on signal line 672, then by looking this syndrome value up in Appendix II, it would be found that data bit 48 is in error and should be placed in the opposite state. Hence, the error correction circuit 690 is suitably activated over lines 682 to correct the data by selectively changing the state for the particular data bit selected. Hence, by the time the leading edge of the third time interval occurs, the bit-in-error has already been decoded and the correction circuit 690 has been set so that as the data is gated out from register zero over lines 622 and through the correction circuit 690 onto the Internal Data bus 520, any detected single bit-in-error has been corrected.

If multiple errors are detected, a set of NOR gates 686 determines the presence of a multiple bit error and a flag is raised on line 560g which comprises one of the Internal Control bus signals on bus 560. The raising of this flag informs the Bus Control Address Circuit 550 that the data being delivered into an internal buffer 530, 540 is invalid and not to use that data. Control 550 will mark the data invalid and then request a re-fetch of the data from bus 10.

In this fashion, it is observed in Table I that a total of six clock cycles are utilized to transfer a block of data 300 comprising four data lines DL into an internal buffer 530, 540 in the I/O ASIC 50. However, from the viewpoint of the multiprocessor bus 10, and with reference back to FIG. 2, it is seen that data residing in memory 20 is delivered directly from memory onto the data portion 10a of bus 10 and directly into the I/O ASIC circuit 50 without any delays for error detection and correction. This arrangement in providing the error detection correction to occur on the I/O ASIC circuit 50 significantly speeds up the operation of the bus 10 in comparison to conventional approaches.

In FIG. 7, the timing for a READ from the bus 10 into the I/O ASIC 50 is shown. The SHIFT signal appearing on line 560c is shown corresponding to the frequency of the bus clock (as shown in FIG. 2, the I/O ASIC 50 is interconnected to the clock 40). A block of data 300a is shown on the bus 10 in time intervals 1-4 (as shown in FIG. 4). The data, as it appears in register one is shown in time intervals 2-5, the data as it appears in register zero is shown in time intervals 3-6 and the data being delivered into a buffer 330 or 340 is shown in time intervals 4-7.

It is to be expressly understood that the next block of data 300b can be delivered into another device such as processor $P_n$ in the next transfer on bus 10 at the bandwidth of the high performance bus 10. Because the I/O ASIC 50 is processing data block 300a, it cannot receive data block 300b. However, from the position of bus 10, the data block 300a is transferred to I/O ASIC 50 at the bandwidth of the bus and one clock cycle later data block 300b can be transferred to another device.

b. Data Transfer to High Performance Bus 10

In FIG. 6, the FIFO-ECC circuit 500 transfers a block of data 300 from the I/O ASIC 50 to the system bus 10 in the following fashion.

Sixty-four bits of a line of data are delivered from an internal buffer 530 or 540 on the Internal Data bus 520b to the input 2:1 multiplexer 600. The input multiplexer 600 is configured by means of a proper signal on lead 560b from the Internal Control bus 560 to convert the input of multiplexer 600 to receive the internal data. This data is then delivered directly into register one 610 by means of a shift signal on 560c from bus control and address circuit 550. The sixty-four bit output of register one is delivered on lines 612 to the check bit generator 650 which generates a new check bit field for the data. The check bit field is delivered on line 652 to the check bit field of register zero 620. During the next clock cycle, a sixty-four bit line of data is delivered from register one into register zero by activation of shift 560c. Hence, at this point, register zero includes the sixty-four bits of data as well as the new check bit field for the data generated by check bit generator 650.

The data in register zero is then delivered into a latch circuit 630 as well as the corresponding check bit information. The output of latch 630 is delivered over bus 632 to the 2:1 output multiplexer 640 which is under control of signal 560e. The output of the output multiplexer 640 is delivered on bus 642 through the pad logic 602 and onto the bus 10a.

The timing for the above described bus WRITE is shown in FIG. 8. Again, the bus clock 40 produces the clock signals defining the time intervals which, as shown, occur in time intervals 1-8. The SHIFT signal is a series of pulses commencing with time interval 2, ending in time interval 7 and corresponding to the frequency of the bus clock. The shift signals are generated on lead 560c by circuit 550. The data from a block buffer 530 or 540 is delivered on Internal Data bus 520b to the input multiplexer 600. At the first SHIFT signal in time interval 2, the DL0 data is gated into register one 610. At the second SHIFT signal at time interval 3, the DL0 data is gated into register zero 620. Between time intervals 2 and 3, the check bit field is generated by circuit 650 and is gated by the second SHIFT pulse at time interval 3 into the check bit field of register zero. Latch circuit 630 is gated by the inversion of the SHIFT pulse which occurs during the second half of time interval 3 so that at time interval 4, the first line of data is gated onto the bus 10a. The gate output enable signal 800 appearing on lead 560a is shown in FIG. 8 to start at the inversion of the SHIFT cycle in the third time interval. Likewise, the gate output enable on lead 560a is disabled at 810 which is at the start of time interval 8.

5. ASIO Internal Block Buffers 540

Figure 9:
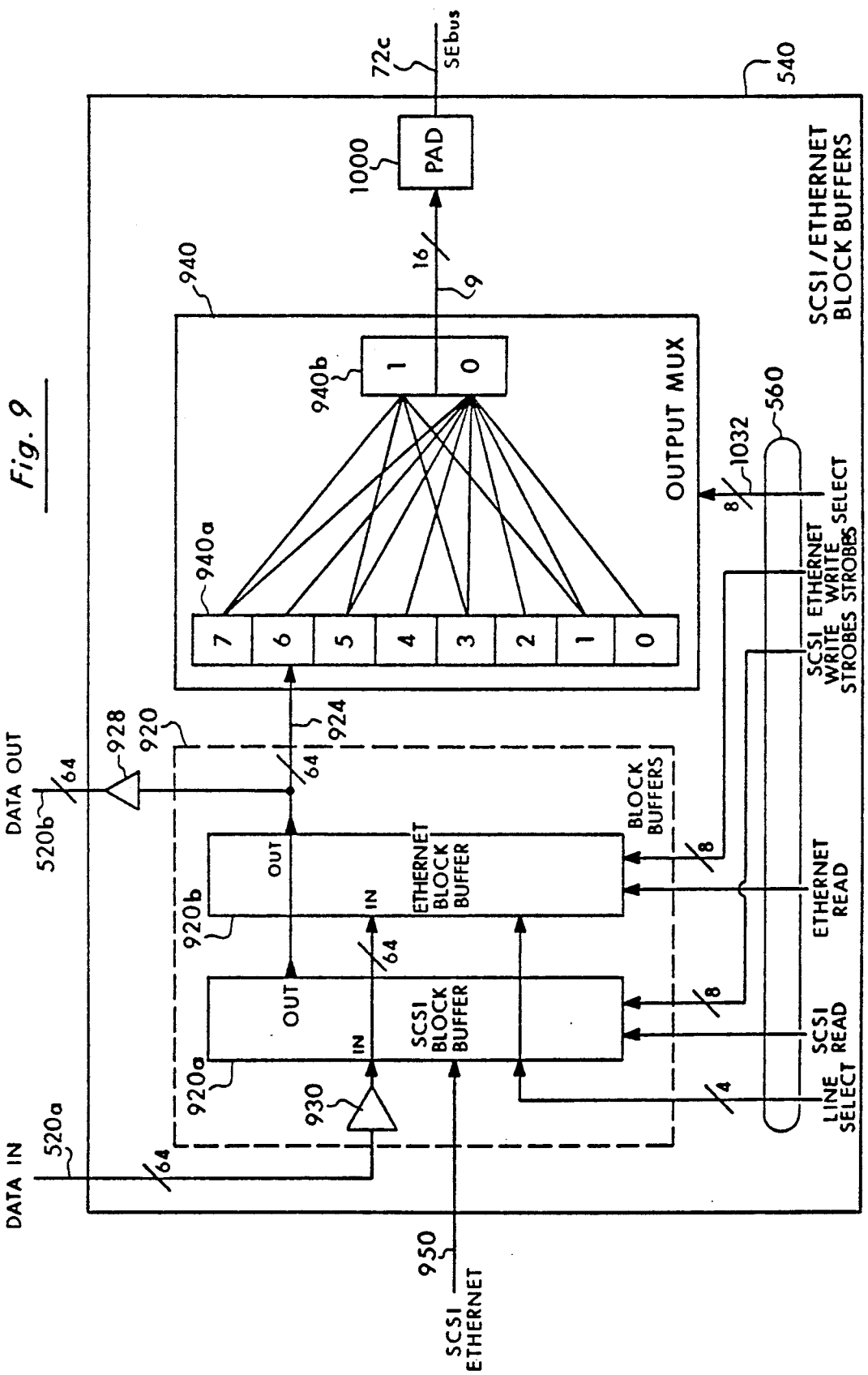
FIG. 9 is a block diagram schematic of the SCSI/Ethernet Block Buffers of the present invention.

In FIG. 9, the block buffers 540 for the SCSI and Ethernet I/O data buses connected to SEbus 72c is shown. With reference to FIGS. 5, 6, and 9, it can be observed that as a block of data leaves the FIFO-ECC circuit 500, at the bandwidth of the multiprocessor bus 10 of the present invention, it is delivered onto the internal data bus 520 of the I/O ASIC 50. In the preferred embodiment, the block of data can be delivered into one of two sets of block buffers —the VMEbus block buffers 530 or the SCSI/Ethernet block buffers 540. In FIG. 9, the two block buffers for SCSI and Ethernet are shown as elements 920a and 920b.

The block of data on internal data bus 520a is delivered into gate 930 which selectively gates the data into buffers 920. For example, when data is being delivered on internal data bus 520a, the bus control and address circuit 550 and managers 570 and 580 deliver control signals over bus 560, as shown in FIG. 9, for line select, read (SCSI), write (SCSI), read (Ethernet), and write (Ethernet). For example, if the SCSI block buffer 920a is selected, the WRITE strobe is activated and the LINE SELECT signal gates in, line-by-line, each of the four lines in the block of data into buffer 920a. This is shown in FIG. 7 with the LINE SELECT series of pulses. This corresponds to the frequency of the bus clock. Hence, it can be observed that the data as it passes through the FIFO-ECC circuit 500 is delivered into either the SCSI or Ethernet block buffer 920 at the bandwidth of bus 10 based upon the appropriate activation of central lines 560.

After delivery, the data can be read out from the SCSI block buffer 920a under control of the Ethernet and SCSI bus control, address, buffer manager circuit 580 as shown in FIG. 5. For example, when the block of data is to be delivered from the block buffers 540, the appropriate control signals are delivered over bus 560 to configure the block buffers 540 as follows, in the case of a SCSI transfer. The appropriate buffer is selected by activating the appropriate READ lead for SCSI and the output multiplexer 940 is configured over the SELECT lead 1032. The output multiplexer 940 takes in 8 bytes number "0" through "7" (940a) and muxes it down to two output bytes 940b.

The output multiplexer 940 generates two types of outputs. The first is a word (two bytes) for the Ethernet bus and the second is a byte for the SCSI bus. Hence, logic exists on the output multiplexer 940 to configure the multiplexer so that in a SCSI transfer, the eight input bytes 940a are sequentially delivered out through byte 0 of mux output 940b. In the case of the Ethernet data transfer, two bytes at a time are transferred from mux input 940a into mux output 940b and out over the SEbus 72c. When one line of data in mux input 940a is transferred, the line select is activated to transfer the next line of data from the block buffer until all four lines of data are transferred.

During the transfer of data out from the block buffers 540, the Ethernet and SCSI bus control 580 operates the transfer at the bus speed of the appropriate bus. Hence, in the case of a SCSI transfer, a byte-by-byte transfer of each line occurs at the bandwidth of the SCSI bus.

In FIG. 9, data is written into the block buffers 920 over bus 950 which is obtained from the I/O buses. This data is multiplexed in a similar fashion as described for the output multiplexer 940. The loading of the block buffers 920 occurs at the bandwidth of either the SCSI or Ethernet buses. However, once loaded, the data is transferred out over bus 924 through gate 928 and onto the internal data bus 520b. It is then delivered into the input multiplexer 600 of the FIFO/ECC 500 as shown in FIG. 6 for delivery to the multiprocessor system bus.

6. Error Correction Circuit 100

While the above discussion has gone into the details of the error correction circuit 110 on the I/O ASIC 50 of the system board 30 of the present invention, it is to be expressly understood that the distributed error correction circuit 100 for each of the processors $P_n$ functions in the same fashion as set forth in FIG. 6 for the FIFO-ECC 500. Both circuits 100 and 110 contain a two-stage pipeline of data transfer (Reg 1 and Reg 0) so that error correction occurs by means of a check bit generator 650, syndrome generator 660, syndrome register 670, decode circuit 680 and correction circuit 690 as shown in FIG. 6. After the data leaves the ECC, it is delivered over an internal processor bus to a resident cache. Just as in FIGS. 6, 7 and 8, the ECC 100 at each processor operates at the clock rate (which, as shown in FIG. 2, is delivered to each error circuit 100) to receive a data block from the bus 10 at the bandwidth of the bus for delivery into an internal cache. The processor can then obtain the block of data from the cache, at the bandwidth of the processor. Under the teachings of the present invention, each processor $P_n$ of FIG. 2 can have a different bandwidth and still perform the distributed error correction of the present invention.

In FIG. 9, which is a buffer in I/O ASIC 50 (or a corresponding cache in processor $P_n$), the buffer (or cache) is unloaded at a bandwidth entirely separate from the clock 40 controlling bus 10 of the present invention.

Figure 10:
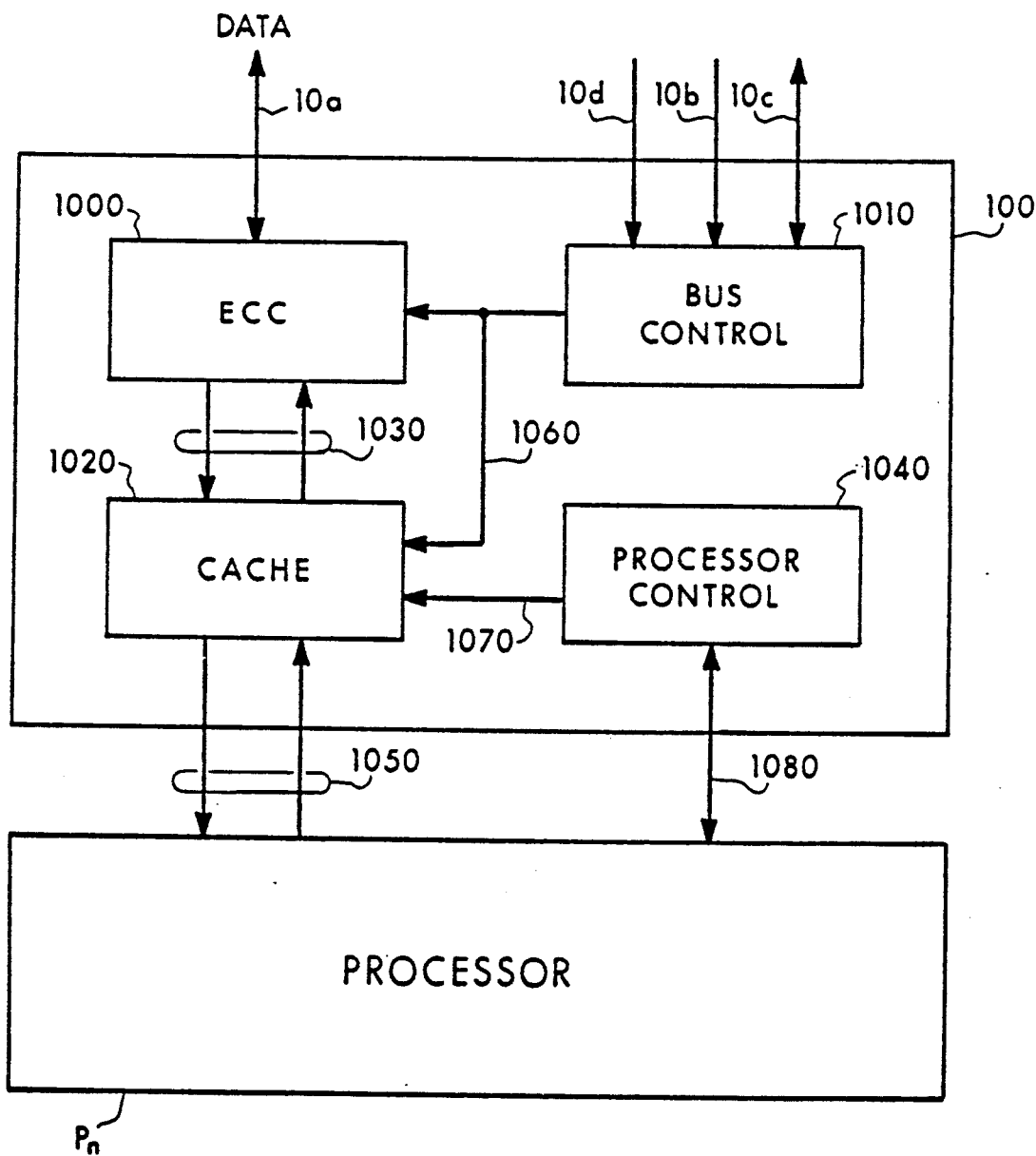
FIG. 10 is a block diagram schematic of the error correction circuit 100 for each processor $P_n$.

This is shown in the processor error circuit 100 of FIG. 10 wherein the ECC 1000 is shown connected to a bus control 1010 and to cache 1020. The ECC 1000 is comparable in design to the ECC 500 of FIG. 6. The data is received from bus 10a and delivered over an internal bus 1030 to cache 1020. Cache 1020 (like the buffer of FIG. 9) is under control 1060 of bus control circuit 1010 for receiving the block of data at the bandwidth of the bus (10d) which at the point of storage in cache 1020 is error corrected. The processor control 1040 (like the managers 570 and 580 of FIG. 5) unloads 1070 the data block to the processor $P_n$ over bus 1050 at the bandwidth of the processor. The processor $P_n$ delivers the necessary control signals over bus 1080 to processor control circuit 1040.

Figure 11:
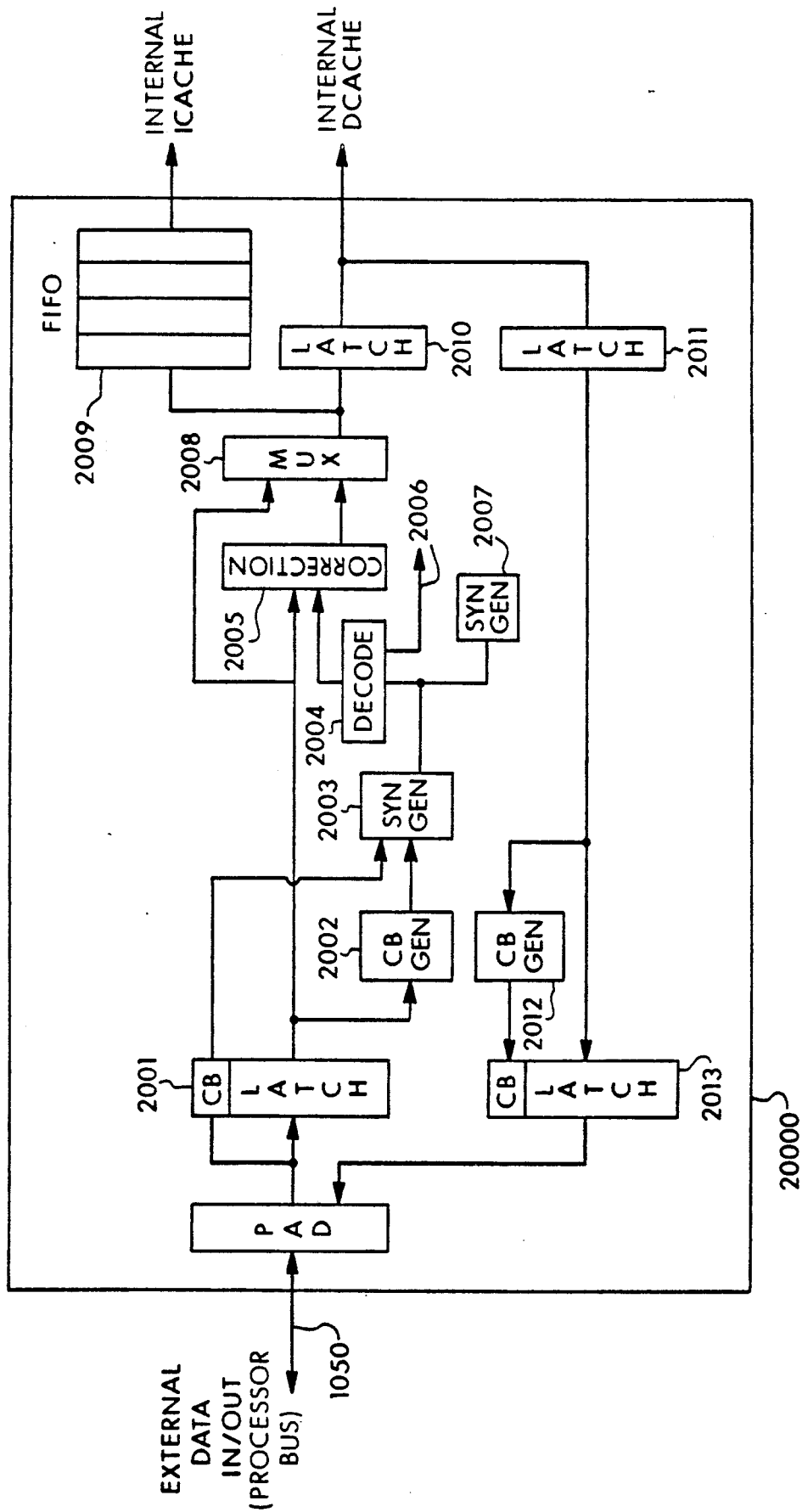
FIG. 11 is a block diagram schematic of the ECC of the present invention located in a processor Pn.

FIG. 11 is a block diagram showing one example of error correction circuit of the present invention in a processor. This processor has a data cache and an instruction cache whose block size are 8 bytes of one memory line, 32 bytes of 4 memory lines, respectively.

In case of a read cycle, 64-bit data and 8-bit check bits are applied through processor bus 1050 to ECC circuit 2000 and stored in latch 2001. A check bit generator 2002 generates 8-bit check bits from data stored in latch 2001. Syndrome generator 2003 generates syndrome bits from check bits stored in latch 2001 and check bits generated by check bit generator 2002. The syndrome bits are decoded by decoder 2004. In case that there is one bit error in data supplied through processor bus 1050, such an error is corrected by corrector 2005 and in case that there is two bit error, a multi-bit error detection signal 2006 is generated. A syndrome register 2007 stores syndrome bits in case that error occurs. Multiplexer 2008 produces output of corrector 2005 in case that ECC circuit 2000 is in enable situation and produces data stored in latch 2001 in case of disable situation. In case of instruction read, such selectively produced data is stored in FIFO 2009 of 4 memory lines and thereafter, supplied to an instruction cache, and in case of data read, such selectively produced data is stored in latch 2010 and thereafter, supplied to data cache. During the period that check bits are generated, next bus cycle is initiated.

In case of a write cycle, data sent from the data cache is stored in latch 2011, and with regard to the data, check bit generator 2012 generates check bits and the check bits and data are stored in latch 2013 and outputted to outside from the processor bus.

By providing check bit generators for use in reading and writing, respectively, data writing is prepared during the period of instruction read.

In FIG. 2, the distributed ECC apparatus and method of the present invention is shown. Error correction occurs upon data transfers from memory 20 to any of the bus data circuits, $P_n$ or I/O ASIC 50. However, error correction also occurs for data transfers between a given processor and another processor, between a given processor and the I/O ASIC 50 or between the I/O ASIC 50 and a given processor. For example, if processor $P_o$ transfers a block of data to processor $P_i$, any single bit errors generated during the transfer would be detected by the ECC 100 of processor $P_i$ and corrected before delivery to the cache 1020 of processor $P_i$. Multibit errors would cause the transfer to be invalidated. In the preferred embodiment of the present invention, the memory 20 is updated with all transfers between processors or between I/O ASIC 50 and the processors.

It is to be expressly understood that the claimed invention is not to be limited to the description of the preferred embodiment but encompasses other modifications and alterations within the scope and spirit of the inventive concept.

APPENDIX I

| Generated Check Bits | Parity | \multicolumn{25}{c}{Participating Data Bits} |
|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| K_CB[0] | Even (XOR) |   | x | x | x |   | x |   |   | x | x | x |   | x |   | x |   | x | x | x |   | x |   |   |   | x |
| K_CB[1] | Even (XOR) | x | x | x |   | x |   | x |   | x |   | x |   | x |   |   |   | x | x | x |   | x |   | x |   | x |
| K_CB[2] | Odd (XNOR) | x |   |   | x | x |   |   | x |   | x | x |   |   | x |   | x | x |   |   | x | x |   |   | x |   |
| K_CB[3] | Odd (XNOR) | x | x |   |   | x | x | x |   |   |   | x | x | x |   |   | x | x |   |   | x | x | x | x | x |   |
| K_CB[4] | Even (XOR) |   |   | x | x | x | x | x | x |   |   |   |   |   |   | x | x |   | x | x | x | x | x | x | x |   |
| K_CB[5] | Even (XOR) |   |   |   |   |   |   |   |   | x | x | x | x | x | x | x | x |   |   |   |   |   |   |   |   | x |
| K_CB[6] | Even (XOR) | x | x | x | x | x | x | x | x |   |   |   |   |   |   |   |   |   |   |   |   |   |   |   |   | x |
| K_CB[7] | Even (XOR) | x | x | x | x | x | x | x | x |   |   |   |   |   |   |   |   |   |   |   |   |   |   |   |   | x |

| Generated Check Bits | Parity | \multicolumn{25}{c}{Participating Data Bits} |
|---|---|---|---|---|---|---|---|---|---|---|---|---|---|---|---|---|---|---|---|---|---|---|---|---|---|
| | | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| K_CB[0] | Even (XOR) | x |   | x |   |   | x |   | x |   |   |   | x |   | x | x |   | x |   |   | x | x |   |   | x | x |
| K_CB[1] | Even (XOR) |   | x |   | x |   |   |   | x | x | x |   | x |   | x |   | x |   | x |   | x |   |   |   | x | x |
| K_CB[2] | Odd (XNOR) | x | x |   |   | x |   | x | x |   |   | x | x |   |   | x |   | x | x |   |   | x |   |   | x | x |
| K_CB[3] | Odd (XNOR) |   |   | x | x | x |   |   | x | x |   |   |   | x | x | x |   |   |   | x | x | x |   |   | x | x |
| K_CB[4] | Even (XOR) |   |   |   |   | x | x |   |   | x | x | x | x | x | x | x |   |   |   |   |   |   | x | x |   |   |
| K_CB[5] | Even (XOR) | x | x | x | x | x | x | x |   |   |   |   |   |   |   |   | x | x | x | x | x | x | x | x |   |   |
| K_CB[6] | Even (XOR) | x | x | x | x | x | x | x | x | x | x | x | x | x | x | x |   |   |   |   |   |   |   |   |   |   |
| K_CB[7] | Even (XOR) | x | x | x | x | x | x | x |   |   |   |   |   |   |   |   | x | x | x | x | x | x | x | x | x | x |

| Generated Check Bits | Parity | \multicolumn{14}{c}{Participating Data Bits} |
|---|---|---|---|---|---|---|---|---|---|---|---|---|---|---|---|
| | | 50 | 51 | 52 | 53 | 54 | 55 | 56 | 57 | 58 | 59 | 60 | 61 | 62 | 63 |
| K_CB[0] | Even (XOR) |   | x |   | x | x |   |   | x |   | x | x |   |   | x |
| K_CB[1] | Even (XOR) | x |   | x |   | x |   | x |   | x | x |   |   |   |   |
| K_CB[2] | Odd (XNOR) |   | x | x |   |   | x |   | x | x |   |   | x |   | x |
| K_CB[3] | Odd (XNOR) |   |   |   | x | x |   |   |   | x | x | x |   |   |   |
| K_CB[4] | Even (XOR) | x | x | x | x | x | x |   |   |   |   |   |   | x | x |
| K_CB[5] | Even (XOR) |   |   |   |   |   |   | x | x | x | x | x | x | x | x |
| K_CB[6] | Even (XOR) |   |   |   |   |   |   | x | x | x | x | x | x | x | x |
| K_CB[7] | Even (XOR) | x | x | x | x | x | x |   |   |   |   |   |   |   |   | where:
K_CB[0 to 7] = the eight check bits
Participating Data Bits = the data bits 0 thru 63
Parity = Hamming Codes

APPENDIX II

| | Syndrome Bits | S7 | 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|---|---|---|
| | | S6 | 0 | 0 | 1 | 1 | 0 | 0 | 1 | 1 | 0 | 0 | 1 | 1 | 0 | 0 | 1 | 1 |
| | | S5 | 0 | 0 | 0 | 0 | 1 | 1 | 1 | 1 | 0 | 0 | 0 | 0 | 1 | 1 | 1 | 1 |
| | | S4 | 0 | 0 | 0 | 0 | 0 | 0 | 0 | 0 | 1 | 1 | 1 | 1 | 1 | 1 | 1 | 1 |
| S0 S1 S2 S3 | | | | | | | | | | | | | | | | | | |
| 0 0 0 0 | | | N | C7 | C6 | U | C5 | U | U | U | C4 | U | U | U | U | D46 | D62 | U |
| 0 0 0 1 | | | C3 | U | U | U | U | D43 | D59 | U | U | D53 | D37 | U | U | U | U | U |
| 0 0 1 0 | | | C2 | U | U | U | U | D41 | D57 | U | U | D51 | D35 | U | D15 | U | U | D31 |
| 0 0 1 1 | | | U | U | U | U | D13 | U | U | D29 | D23 | U | U | D7 | U | U | U | U |
| 0 1 0 0 | | | C1 | U | U | U | U | D40 | D56 | U | U | D50 | D34 | U | U | U | U | U |
| 0 1 0 1 | | | U | D49 | D33 | U | D12 | U | U | D28 | D22 | U | U | D6 | U | U | U | U |
| 0 1 1 0 | | | U | U | U | U | D10 | U | U | D26 | D20 | U | U | D4 | U | U | U | U |
| 0 1 1 1 | | | D16 | U | U | D0 | U | U | U | U | U | U | U | U | U | U | U | U |
| 1 0 0 0 | | | C0 | U | U | U | U | U | U | U | U | U | U | U | D14 | U | U | D30 |
| 1 0 0 1 | | | U | U | U | U | D11 | U | U | D27 | D21 | U | U | D5 | U | U | U | U |
| 1 0 1 0 | | | U | U | U | U | D9 | U | U | D25 | D19 | U | U | D3 | U | D47 | D63 | U |
| 1 0 1 1 | | | U | U | U | U | U | D45 | D61 | U | U | D55 | D39 | U | U | U | U | U |
| 1 1 0 0 | | | U | U | U | U | D8 | U | U | D24 | D18 | U | U | D2 | U | U | U | U |
| 1 1 0 1 | | | D17 | U | U | D1 | U | D44 | D60 | U | U | D54 | D38 | U | U | U | U | U |
| 1 1 1 0 | | | U | U | U | U | U | D42 | D58 | U | U | D52 | D36 | U | U | U | U | U |

-continued

APPENDIX II

| 1 | 1 | 1 | 1 | U | D48 | D32 | U | U | U | U | U | U | U | U | U | U | U | U | U |
|---|---|---|---|---|-----|-----|---|---|---|---|---|---|---|---|---|---|---|---|---| where:
N = No Error Detected
U = Uncorrectable Error
S0 to S7 = Syndrome Bits
D0–D63 = Data Bits
C0–C7 = Check Bits

We claim:

1. A memory error correction system for a multiprocessor system, said system having a system bus, a memory directly connected to said bus, said memory containing lines of data and a plurality of bus data circuits connected to said system bus, said bus data circuits selected from the group consisting of one or a plurality of processors or one or a plurality of input/output bus interface circuits, said memory error correction system comprising:
   means connected to each of said plurality of bus data circuits and to said system bus for selectively receiving a line of data with an error field from said memory over said system bus at the bandwidth of the bus,
   means in said receiving means and receptive of said memory line of data for detecting errors originating either in said memory of during transfer on said system bus in said memory line of data as said memory line of data is being received from said system bus, said detecting means also automatically correcting any detected errors in said memory line of data after said memory line of data is received,
   means connected to said detecting means for storing said corrected memory line of data, said receiving means comprising:
   a first register having a bit width equal to the bit width of said line of data,
   means for detecting errors in a line of data resident in said first register during the transfer time interval for said line of data from said first register to said second register,
   means for correcting said errors in said line of data during the time interval when said data is transferred from said second register to said storing means.

2. The system of claim 1 wherein said detecting means detects and corrects the presence of a single bit error in said memory line of data.

3. The system of claim 2 wherein said error field comprises a check bit field and wherein said detecting means further comprises:
   means receptive of each said memory line of data for generating a new check bit field,
   means connected to said generating means and receptive of said new check bit field for comparing said new check bit field with said received check bit field, said comparing means issuing a syndrome signal based upon said comparison,
   means receptive of said syndrome signal from said comparing means for correcting said memory line of data as said memory line of data is stored in said storing means.

4. The system of claim 1 wherein said system bus is synchronous.

5. A memory error correction system for a high performance processor system, said system having a memory directly connected to said system bus, and at least one input/output bus interface, a high performance system bus, said memory error correction system comprising:
   means connected to said at least one input/output bus and to said system bus for selectively receiving a block of data from said memory over said system bus at a first bandwidth at least equal to or greater than the bandwidth of said memory, said block of data having a plurality of lines,
   means on said receiving means and receptive of said block of data for detecting errors originating in said memory or on said system bus present in said block of data as said block of data is being received from said system bus, said detecting means also correcting any detected errors caused by said memory or said system bus as said block of data is being received,
   means connected to said detecting means for storing said corrected block of data,
   means connected to said storing means for delivering said stored block of data at a second bandwidth from said storing means to said at least one input/output bus interface, said second bandwidth being less than said first bandwidth, said receiving means comprises:
   a first register having a bit width equal to the bit width of a line of data in said block of data,
   a second register having a bit width equal to the bit width of said line of data,
   means for detecting errors in a line of data resident in said first register during the transfer time interval for said line of data from said first register to said second register,
   means for correcting said errors in said line of data when said data is transferred from said second register to said storing means.

6. The system of claim 5 wherein said first bandwidth is at least 128 Mbytes/second and said second bandwidth is less than 40 Mbytes/second.

7. The system of claim 5 wherein the rate of transfer between said first and second registers equals said first bandwidth.

8. The system of claim 5 wherein said detecting means detects and corrects the presence of a single bit error in a line of data in said block of data.

9. The system of claim 8 wherein each line of said block of data has a check bit field and wherein said detecting means further comprises:
   means receptive of each said line of said block of data for generating a new check bit field,
   means connected to said generating means and receptive of said new check bit field for comparing said new check bit field with said received check bit field, said comparing means issuing a syndrome signal based upon said comparison,
   means receptive of said syndrome signal from said comparing means for correcting said line of said block of data as said line is stored in said storing means.

10. A distributed memory error correction system for a high performance multiprocessor system, said system having a multiprocessor bus, a memory directly connected to said multiprocessor bus without an error correction circuit at the output of said memory to said multiprocessor bus, and at least one input/output bus interface circuit, said distributed memory error correction system comprising:

first means connected to said at least one input/output bus interface circuit and to said multiprocessor bus for selectively receiving a block of data from said memory or from one of said processors over said multiprocessor bus at a multiprocessor bus bandwidth at least equal to or greater than the bandwidth of said memory, said block of data having a plurality of data lines with each data line having an error field, said first receiving means being further capable of detecting and correcting errors in said block of data based on said error field as said block of data is being received wherein said first receiving means comprises:
(a) a first register having a bit width equal to the bit width of a line of data in said block of data,
(b) a second register having a bit width equal to the bit width of said line of data,
(c) means for detecting errors in a line of data resident in said first register during the transfer time interval for said line of data from said first register to said second register means for correcting said errors in said line of data when said data is transferred from said second register, means connected to said first receiving means for delivering said corrected block of data to said at least one input/output bus interface circuit at the bandwidth of said at least one input/output bus, said input/output bandwidth being less than said memory bandwidth, second means on each of said plurality of processors and connected to said multiprocessor bus for selectively receiving said block of data containing said error field from said memory or from one of said other processors over said multiprocessor bus at said multiprocessor bus bandwidth, said second receiving means being further capable of detecting and correcting any errors in said block of data based on said error field as said block of data is being received, means on each of said plurality of processors and connected to said second receiving means for delivering said corrected block of data to each said processor at the bandwidth of said at least one processor.

11. A high performance multiprocessor system, said system comprising:
a synchronous system bus,
a memory directly connected to said synchronous bus without an error correction circuit between the output of said memory and said system bus,
blocks of data stored in said memory, each block of data having a plurality of lines of data and each line of data having a check bit field,
a plurality of processors connected to said system bus,
one or a plurality of input/output buses,
one or a plurality of input/output interfaces, each of said input/output interfaces being connected to an input/output bus and operating at the respective bandwidth of the interconnected input/output bus, and
a plurality of error correction circuits, one of said error correction circuits connection between said system bus and said input/output interface and one of said error correction circuits connected between said system bus and each of said processors, each said error correction circuit comprising:
(a) means receptive of said line of data for detecting errors originating either in said memory or during transfer on said system bus in said line of data as said line of data is being delivered from said system bus, said detecting means automatically correcting any detected errors in said memory line of data after said memory line of data is delivered,
(b) means connected to said detecting means for storing said corrected line of data at the bandwidth of said synchronous system bus, and
(c) means connected to said storing means for transferring said corrected line of data between said storing means and connected processor or input/output circuit at the bandwidth of said connected processor or input/output circuit, said detecting means comprising:
a first register having a bit width equal to the bit width of a line of data,
a second register having a bit width equal to the bit width of said line of data,
means for detecting errors in a line of data resident in said first register during the transfer time interval for said line of data from said first register to said second register,
means for correcting said errors in said line of data when said data is transferred from said second register to said storing means.

12. The system of claim 11 wherein said detecting means detects and corrects the presence of a single bit error in said memory line of data.

13. The system of claim 11 wherein said detecting means further comprises:
means receptive of each said memory line of data for generating a new check bit field,
means connected to said generating means and receptive of said new check bit field for comparing said new check bit field with said received check bit field, said comparing means issuing a syndrome signal based upon said comparison,
means receptive of said syndrome signal from said comparing means for correcting said memory line of data as said line of data is stored in said storing means.

* * * * *